No. 737,844. PATENTED SEPT. 1, 1903.
E. L. HUBBARD.
OPTICAL INSTRUMENT.
APPLICATION FILED MAR. 21, 1898.
NO MODEL.
FIG. 1.
FIG. 2.
FIG. 3.
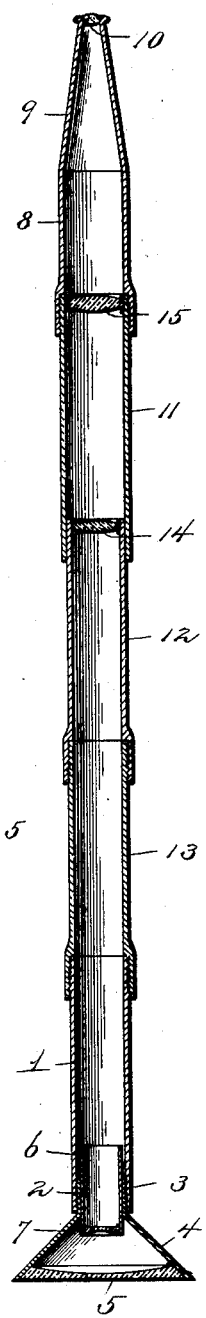
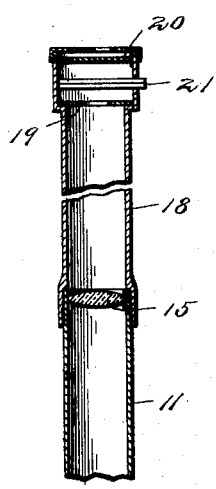
Witnesses
Harry L. Ames,
J. F. Walker.
Inventor
Edward L. Hubbard,
by V. D. Stockbridge
his Attorney.
THE NORRIS PETERS CO., PHOTO-LITHO., WASHINGTON, D. C.

No. 737,844.

Patented September 1, 1903.

UNITED STATES PATENT OFFICE.

EDWARD LECOMPT HUBBARD, OF BALTIMORE, MARYLAND.

OPTICAL INSTRUMENT.

SPECIFICATION forming part of Letters Patent No. 737,844, dated September 1, 1903.

Application filed March 21, 1898. Serial No. 674,714. (No model.)

*To all whom it may concern:*

Be it known that I, EDWARD LECOMPT HUBBARD, a citizen of the United States, residing at Baltimore, in the State of Maryland, have invented certain new and useful Improvements in Optical Instruments; and I do hereby declare the following to be a full, clear, and exact description of the invention, such as will enable others skilled in the art to which it appertains to make and use the same.

My invention is designed for the production of an optical instrument by means of which objects located beneath the surface of the water may be readily viewed, examined, or photographed.

Various attempts have been made in the past to construct instruments which would be of aid in locating beds of oysters, sponges, and the like beneath the surface of the sea; but so far as I am aware all such efforts have been unsuccessful, among the principal reasons for their failure being the difficulty in sinking the instrument to the desired depth, in gaining sufficient light upon the object by means of which it might be observed, and in securing the proper arrangement of lenses for the purpose.

In a patent granted to me December 8, 1896, No. 572,803, is shown and described a device for inspecting the bottom of streams in which a flaring or cone-shaped sight-tube is employed, having an object-glass in the lower end thereof and a weight thereon, by means of which the instrument could be introduced and sunk into the water. In actual practice with the device referred to it has been found that the weight of the instrument, in order that it might be sunk to the proper depth, was so great that the same could not be effectually handled, and was on this account inoperative. Furthermore, no means were provided in this or any other instrument, so far as I am advised, for collecting all the rays of light which were attainable adjacent to the object to be observed.

The ordinary telescope, which at first my invention appears to resemble in some respects, acts upon an entirely different principle from my instrument in that in a telescope objects distant from the object-glass of the instrument are viewed, whereas with my instrument the object-glass is placed near to the object to be viewed. A telescope cannot operate beneath the water.

The object of my invention is to overcome the difficulties heretofore met with and to produce a device which will successfully accomplish the end sought. This object is attained by the means illustrated in the accompanying drawings, and hereinafter described in detail, in which description other objects and advantages of the invention will appear.

In the drawings, Figure 1 represents a central longitudinal section through an instrument constructed in accordance with my invention. Fig. 2 is a detail sectional view of a reflecting attachment employed, and Fig. 3 is a similar view of the camera shown applied to one of the sections of the instrument.

Like reference-numerals indicate like parts in the different views.

In carrying out my invention I employ a series of sections suitably connected together, those designed to be passed beneath the surface of the water being provided with screws or other water-tight connections between them. The object-glass end piece or section 1 is provided with internal screw-threads 2 at its lower end, with which are adapted to engage corresponding external screw-threads 3 upon the shank of a funnel-shaped or flaring light-collecting cap 4. The outer or lower end of said cap has secured to it by a water-tight joint the object-glass 5, which is illustrated in the drawings as a plano-concave lens of large size, the plane surface of said lens being outermost. Fitting and longitudinally movable within the shank of the cap 4 is a tube 6, in which is mounted a diminishing and ray-collecting lens or what may be termed a "second" object-glass 7, which, as shown, is a plano-concave lens of smaller diameter than the lens 5. The concave surfaces of the lenses 5 and 7 are opposed to each other, for a purpose which will appear later, and the tube 6 is made adjustable with respect to the cap 4, so as to obtain the proper adjustment between the lenses 5 and 7. The removable eyepiece 8, constituting one of the sections of my instrument at the end opposite the cap 4, is formed with a tapering or contracted end 9, in which is located a magnifying-glass 10 of high power. Between the eyepiece 8 and the section 1 is a plurality of sections 11, 12, and 13. Any number of these sections may be employed; but in the drawings I have illustrated three. All of the same, except sections 11 and 12, are rigidly connected by water-tight joints, as heretofore stated, so as to prevent the entrance of water to the inside of the instrument. The sections 11 and 12 are adapted to telescope for a purpose hereinafter described. In the section 12 is a convex or double-convex lens 14, and in the upper end of the section 11 is a second convex or double-convex lens 15, the lens 15 being preferably of double the power of the lens 14.

The operation of the device constructed as shown and described is as follows: The instrument is sunk into the water by any suitable means until the glass 5 is adjacent to the object to be observed, and by the reason of the fact that the flaring or funnel-shaped cap 4 is provided, in which said glass is located, the instrument is adapted to cover a greater field or area of observable space and to receive a greater amount of light from the water than could be done if the instrument were made of the same diameter throughout its entire length. It may be stated, however, that the instrument could be operated without the provision of the cap 4; but by it I am enabled to view objects of large size through tubes constituting sections of the instrument which are of comparatively small diameter. By making the sections of small diameter I not only save expense in the construction of the device, but attain the much more desirable object of diminishing the weight of the instrument and overcoming the difficulty of maintaining the instrument in a submerged position. The light from the object viewed is collected by the plano-concave lens 5 and transmitted up into the cap 4. These rays are received by the diminishing-lens or second object-glass 7, which, as illustrated and as heretofore stated, is a plano-concave lens reversely located to that of the lens 5 and acts to refract the converging rays of light and transmit them in direct or parallel lines. Meeting the double-convex lens 14 in the section 12, the rays are focused a short distance above said lens—say, for example, seven inches—and are radiated from its focus and again collected by the stronger lens 15, which, of course, is located at the same distance from the focus as the lens 14. The lens 15 serves to reverse the position of the image of the object viewed from that in which it is transmitted from the lens 14, restoring the same to its natural or upright position, and while the focal distance of lens 15 is shorter than that of lens 14 the image formed will not necessarily be nearer 15 than 14, because the rays of light strike lens 14 in parallel lines, while they strike lens 15 at an angle to each other. The magnifying-glass 10 in the eyepiece 8 serves to increase the size of the image, it being particularly designed for the purpose of restoring the size of the image as viewed by the eye to the natural size of the object.

By the construction described I have attained an object sought after for a long time, but to the best of my knowledge and belief never reached.

The instrument constructed as set forth is adapted only for viewing the upper surface of an object. If it be desired, however, to view an object from one side or from beneath—as, for example, the sides or keel of a vessel—the same may be accomplished by means of the attachment illustrated in Fig. 2 of the drawings. The said attachment consists of an L-shaped tube or elbow 16, adapted to be attached to the lower end of the section 1 and provided on the inside thereof, and in the angle of the elbow with a reflector 17, set at angle of forty-five degrees to each arm of the elbow. In applying the attachment the cap 4 and the sleeve 6, with the lenses 5 and 7 carried thereby, are first removed from the section 1, the vertical portion of the elbow applied to the lower end of said section 1, and the cap 4, with the parts carried thereby, afterward applied to the outer or horizontal portion of said elbow. The light from the object transmitted by the lenses 5 and 7 is reflected by the reflector 17, so that it is conveyed at an angle of ninety degrees from that in which it is received by said reflector.

It is frequently found desirable to photograph objects beneath the surface of the water. I am enabled to do this by the attachment to my device which is illustrated in Fig. 3 of the drawings. The same consists of an ordinary camera, comprising a sleeve or tubular portion 18, a perforated diaphragm 19, a ground glass or camera obscura 20, and a plate-holder 21 for the reception of plates. In applying this camera the eyepiece 8 is removed from the section 11 and the tubular portion 18 applied to the section 11. The sections 11 and 12, carrying the lenses 14 and 15, being extensible, the object may be properly focused on the ground glass 20 and the same photographed in the usual manner. The camera itself carries no lens.

Should it be desired to use my instrument for viewing objects at night in the case of an accident, like the loss of an anchor or the falling of a man overboard, a light may be attached to the lower end of the instrument adjacent to the cap 4.

By use of the cap 4, which constitutes an extension of the tube or body of the instrument and which projects beyond the diminishing-lens, I am enabled to approach very near the object or surface to be examined. This cap or extension may be of any size and operates to exclude water, while freely admitting the rays of light. Thus instead of being compelled to look through a foot or more of water which is often muddy and dense only a few inches need intervene between the glass at the end of the instrument and the object being viewed. The object-glass 5 may consist of a lens of any power, according to requirements, and, in fact, may not be a lens at all, but may consist of a plate or sheet of transparent glass, as the diminishing-lens 7 will collect the rays of light and project the same through the tube until they are caught by the focusing-lens, focused, and transmitted to the magnifying-lens of the eyepiece or sensitized surface upon which the photographic image is to be received.

Having thus described my invention, what I claim as new, and desire to secure by Letters Patent, is—

1. A subaqueous optical instrument comprising a concave lens as the objective, a magnifying-lens as the eyepiece, and a convex lens so situated between the two as to receive the parallel rays from the objective and focus them at the proper distance from the eyepiece.

2. An optical instrument for the purpose described, comprising a tubular body made up of sections connected by water-tight joints, a flaring or funnel-shaped cap upon the outer of said sections, a plano-concave lens in the outer end of said cap, an adjustably-mounted tube in the shank of said cap, and a plano-concave lens in said tube, the concave surfaces of said lenses being opposed to each other.

3. An optical instrument for the purpose described, comprising a tubular body made up of sections connected by water-tight joints, a flaring or funnel-shaped cap removably connected to the outer of said sections, a plano-concave lens constituting the object-glass carried by said cap, whose plane surface is outermost, a tube adjustably mounted in the shank of said cap, and a plano-concave lens carried by said tube, the concave portions of said lenses being opposed to each other.

4. An optical instrument for the purpose described, comprising a tubular body made up of sections connected by water-tight joints, a flaring or funnel-shaped cap upon the outer of said sections, a plano-concave lens carried by said cap, an adjustably-mounted tube in the shank of said cap, a plano-concave lens carried by said tube, the concave surfaces of said lenses being opposed to each other, a plurality of double-convex lenses in said body, an eyepiece constituting one of the sections of said body having a contracted or tapering end, and a magnifying-glass in the end of said eyepiece.

5. An optical instrument comprising a tube, a diminishing ray-collecting object-glass mounted therein, a focusing-lens next to the ray-collecting lens, and an eyepiece and photographic attachment adapted to be interchangeably applied to the body of the instrument back of the focusing-lens.

6. An instrument for viewing subaqueous objects, having a tubular body and a ray-collecting diminishing-lens at or near one end thereof in combination with a cap or extension projecting beyond said lens and having means for excluding water while admitting rays of light directly to the ray-collecting lens.

In testimony whereof I affix my signature in presence of two witnesses.

EDWARD LECOMPT HUBBARD.

Witnesses:
WM. B. HAMMOND,
W. H. MARTIN.